US012612972B2

(12) United States Patent
Świrniak et al.

(10) Patent No.: US 12,612,972 B2
(45) Date of Patent: Apr. 28, 2026

(54) DRAIN VALVE SEALING ARRANGEMENT

(71) Applicant: Goodrich Corporation, Charlotte, NC (US)

(72) Inventors: Paweł Świrniak, Prochowice (PL); Krzysztof Słomiany, Jerzmanowice (PL); Piotr Kroczek, Nieciszów (PL); Adrian Tarnowski, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 5 days.

(21) Appl. No.: 18/629,062

(22) Filed: Apr. 8, 2024

(65) Prior Publication Data

US 2024/0344617 A1 Oct. 17, 2024

(30) Foreign Application Priority Data

Apr. 13, 2023 (EP) ..................................... 23461556

(51) Int. Cl.
F16K 5/20 (2006.01)
F16K 5/06 (2006.01)

(52) U.S. Cl.
CPC ............ F16K 5/205 (2013.01); F16K 5/0689 (2013.01)

(58) Field of Classification Search
CPC ............................... F16K 5/0689; F16K 5/205
See application file for complete search history.

(56) References Cited

U.S. PATENT DOCUMENTS 2,006,715 A * 7/1935 Mccausland .............. F16K 3/36
137/246.16
3,620,243 A * 11/1971 Zatopek ................... F16K 5/205
137/246.22
3,749,357 A * 7/1973 Fowler .................... F16K 5/205
251/315.08
4,085,770 A * 4/1978 Woronowicz ......... F16K 5/0647
137/246.22
4,231,440 A 11/1980 Erwin
4,331,172 A 5/1982 D'Angelo
6,669,171 B1 12/2003 Stunkard
7,004,451 B2 * 2/2006 Malischewsky ........ F16K 5/205
251/172
2018/0038491 A1 * 2/2018 Gaburri ................. F16K 5/0689

FOREIGN PATENT DOCUMENTS

CN       115451152 A    12/2022
DE       19544901 A1     6/1997
GB        2184212 A      6/1987

OTHER PUBLICATIONS

Abstract for DE19544901 (A1), Published: Jun. 5, 1997, 1 page.
European Search Report for Application No. 23461556.5, mailed Sep. 11, 2023, 10 pages.
Machine Translation of CN115451152A, Published: Dec. 9, 2022, 7 pages.

* cited by examiner

*Primary Examiner* — Hailey K. Do

(74) *Attorney, Agent, or Firm* — CANTOR COLBURN LLP

(57) ABSTRACT

A sealing arrangement for a ball valve. The sealing arrangement includes a hydraulic fluid injection port configured to receive pressurised fluid from a pressurised fluid source, and a plurality of fluid channels connected to the injection port and configured to be arranged, in use, around the interior of the ball valve to direct the pressurised fluid to a gap between a seal of the ball valve and a housing of the ball valve to exert a force on the seal towards a ball of the ball valve.

12 Claims, 5 Drawing Sheets

Shim plates

250

Connection ports

DRAIN VALVE SEALING ARRANGEMENT

CROSS REFERENCE TO RELATED APPLICATIONS

This application claims priority to European Patent Application No. 23461556.5 filed Apr. 13, 2023, the entire contents of which is incorporated herein by reference.

TECHNICAL FIELD

The present disclosure relates to providing sealing for a drain valve, particularly a ball valve.

BACKGROUND

A drain valve is a valve component provided in a fluid system from draining fluid from a part of the system. Drain valves are used, for example, to drain waste tanks of a sanitation system e.g. the waste tank of an aircraft vacuum waste system, but may also be used to drain waste, fluid etc. from other systems. Typically, such drain valves are installed in relatively harsh or dirty environments. When used on an aircraft system, for example, the drain valve is typically installed on the outside of the aircraft. It is desirable for such drain valves to have a relatively simple structure, such as a ball valve design, that has only two positions—open and closed.

A preferred drain valve design comprises a valve housing having a fluid inlet opening and a fluid outlet opening, and a ball within the housing between the inlet opening and the outlet opening. The ball is provided with a channel therethrough and is rotatable relative to the housing e.g. by means of a user-operated lever extending to the outside of the housing. The ball is rotated between the open position, in which the channel is aligned with the inlet opening and the outlet opening to form a fluid channel from the inlet opening through the channel to the outlet opening, and the closed position in which the channel is not aligned with, and does not overlap with the inlet opening and the outlet opening, so that the body of the ball blocks flow through the valve. Such ball valves are well-known and will not be described further.

Because fluid e.g. water flows through the valve, there is a danger of fluid leaking to the area around the ball, within the housing and/or fluid or debris from outside getting into any space between the ball and the housing. In very cold temperatures, this fluid may freeze. Any debris can also adversely affect the operation of the valve. Seals are, therefore, typically provided between the housing and the ball. In a common ball valve design, the housing comprises two housing parts—an upper part and a lower part—that are fastened together around the ball, the upper part having the inlet opening and the lower part having the outlet opening. The housing parts design to accommodate the ball such that it can rotate between the open and closed positions in the housing. Seals are provided between the housing parts and the ball to address the problems of fluid and debris mentioned above.

To ensure reliable sealing and compensate for any manufacturing and assembling tolerances in the housing parts, as well as to press the seals tightly to the ball (whilst still allowing rotation), shim plates are usually fitted between the housing part and the seal to tension the seal against the ball. In designing and assembling the valve, different thicknesses and different numbers of shim plates will be inserted/removed until the required pre-tension of the seal exits. Manufacturing and material variations in housing parts mean that it is often necessary to arrive at the required number/thickness of shim plates by trial and error. This increases the complexity and time of assembly, which in turn increases the overall cost of the valve and increases the chance of faulty assembly and leakage/damage to the valve.

There is, therefore, a need for an improved way of providing sealing in a drain valve.

SUMMARY

Accordingly, there is provided a sealing arrangement for a ball valve, the sealing arrangement comprising a hydraulic fluid injection port configured to receive pressurised fluid from a pressurised fluid source, and a plurality of fluid channels connected to the injection port and configured to be arranged, in use, around the interior of the ball valve to direct the pressurised fluid to a gap between a seal of the ball valve and a housing of the ball valve to exert a force on the seal towards a ball of the ball valve.

Also provided is a ball valve assembly and a method of sealing a ball valve.

BRIEF DESCRIPTION

Examples of the rinse device according to this disclosure will be described with reference to the drawings. It should be noted that these are merely examples and variations are possible within the scope of the claims.

DETAILED DESCRIPTION

Figure 1:
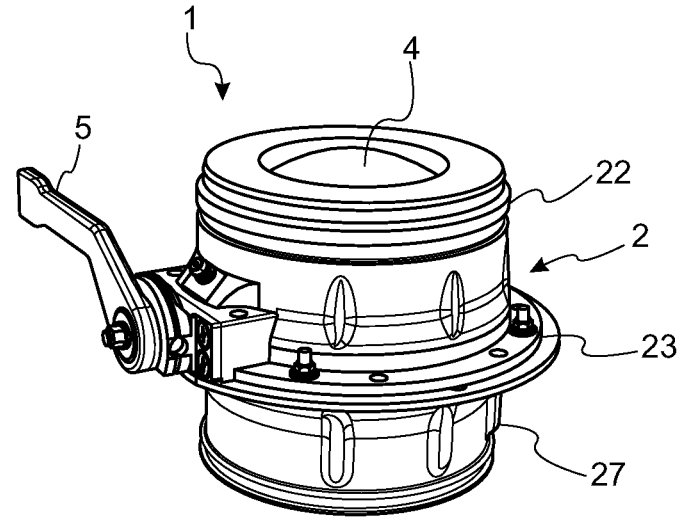
FIG. 1 is a 3D view of a drain valve.

FIG. 1 shows an example of a drain valve 1 within which the sealing assembly of the present disclosure may be incorporated. The drain valve comprises a housing 2 comprising an upper housing part 22 and a lower housing part 24 which are bolted together at 23 to form a housing around a valve ball 4. A lever 5 is provided on the outside of the housing 2 for rotation by a user. The lever is operatively connected to the ball 4 inside the housing 2 such that rotation of the lever 5 causes rotation of the ball 4 relative to the housing 2.

Figure 2:
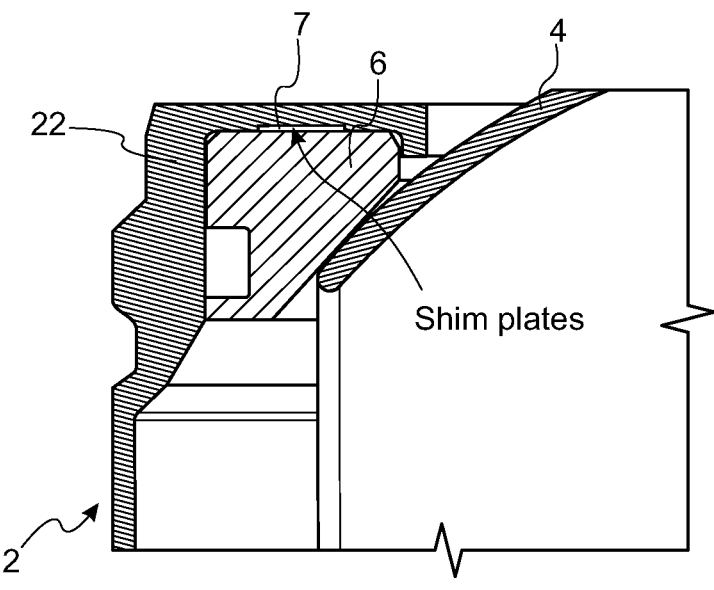
FIG. 2 shows a known sealing arrangement by way of background.

As described above, typically, as seen in FIG. 2, seals 6 are provided between the housing (here upper part 22) and the ball 4. The seal 6 needs to be pre-tensioned against the ball 4 so as to provide a fluid-tight seal but to allow rotation of the ball relative to the housing 2. To ensure the required pre-tensioning regardless of different manufacturing and assembly tolerances, shim plates 7 are inserted between the housing part and the seal to add tension to the seal, against the ball. Different thicknesses/numbers of shim plates 7 may be needed at different locations in the same valve and may also be different for different vales, even of the same general design due to variations in assembled parts.

The sealing arrangement of the present disclosure uses hydraulic fluid e.g. grease or oil, fed into the space between the housing and the seal to apply hydraulic pressure to the seal to tension it against the ball, as will be described further below, with reference to FIGS. 3 to 8.

Figure 3:
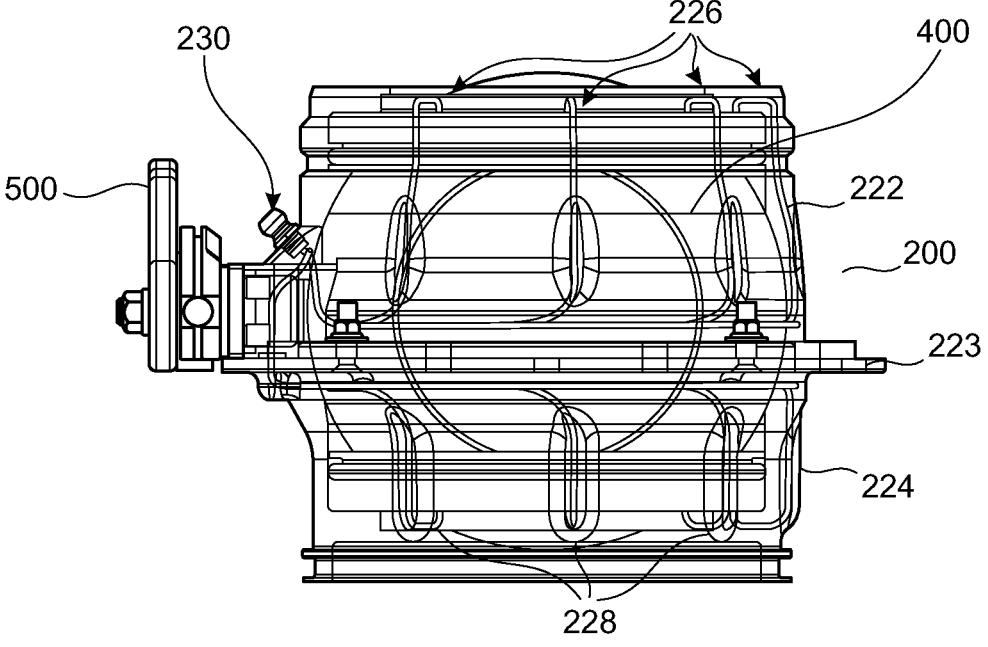
FIG. 3 shows a drain valve incorporating sealing according to the disclosure.

The hydraulic pressure is provided by injection of the hydraulic fluid into channels within the housing to feed the hydraulic fluid between the housing and the seal. As seen in FIG. 3, in a housing 200 of two housing parts 222, 224 joined together at 223, hydraulic fluid channels 226, 228 are provided in the interior of each housing part 222, 224 and a hydraulic fluid e.g. oil or grease is injected into the channels via one or more injection ports or nipples 230 on the outside of the housing 200, and is guided by the channels into a gap 240 between the housing and the seal 600 (see FIG. 4). The injection nipple(s) is/are preferably located close to the middle of the housing where the two housing parts join 223. This is particularly preferably when only one or two injection nipples are provided to supply the fluid to both the top and the bottom of the housing via respective channels, since this allows for a minimal channel length from the nipple(s). The channels preferably run from the nipple/nipples up/down along an inner side of the respective housing parts and end at the gap above/below the respective seals. As can be seen in e.g. FIG. 5, channels may run from the nipple(s) around the housing and along circumferentially spaced sub-channels or branches 227, which run to the gap between the seal 600 and the housing where the open ends of the sub-channels are positioned to eject the hydraulic fluid into that gap around the seal.

The examples shown have two housing parts joined at the middle of the housing. Other housing structures may be formed of one, or more than two housing parts and the channels would then be disposed in the housing parts at relevant locations to feed in hydraulic fluid so as to apply pressure to the seals 600 (best seen in FIG. 4), against the ball 400. The housing shape can be optimised for e.g. size/weight reduction and this is simplified by using additive manufacture.

In the example shown in FIG. 3, the hydraulic fluid is provided to both/all fluid channels 226, 228 from a single nipple 230, but in other designs, the fluid may be provided via more than one nipple feeding to the channels inside the housing 200. FIG. 3 also shows a lever 500, for rotating the ball 400 in the same way as described above for FIG. 1.

By pumping fluid into the channels via the nipple 230, the pressure applied to the seals may be set and provided as required to ensure the desired tension between the seal and the ball.

The channels may be formed using additive manufacturing.

Figure 4:
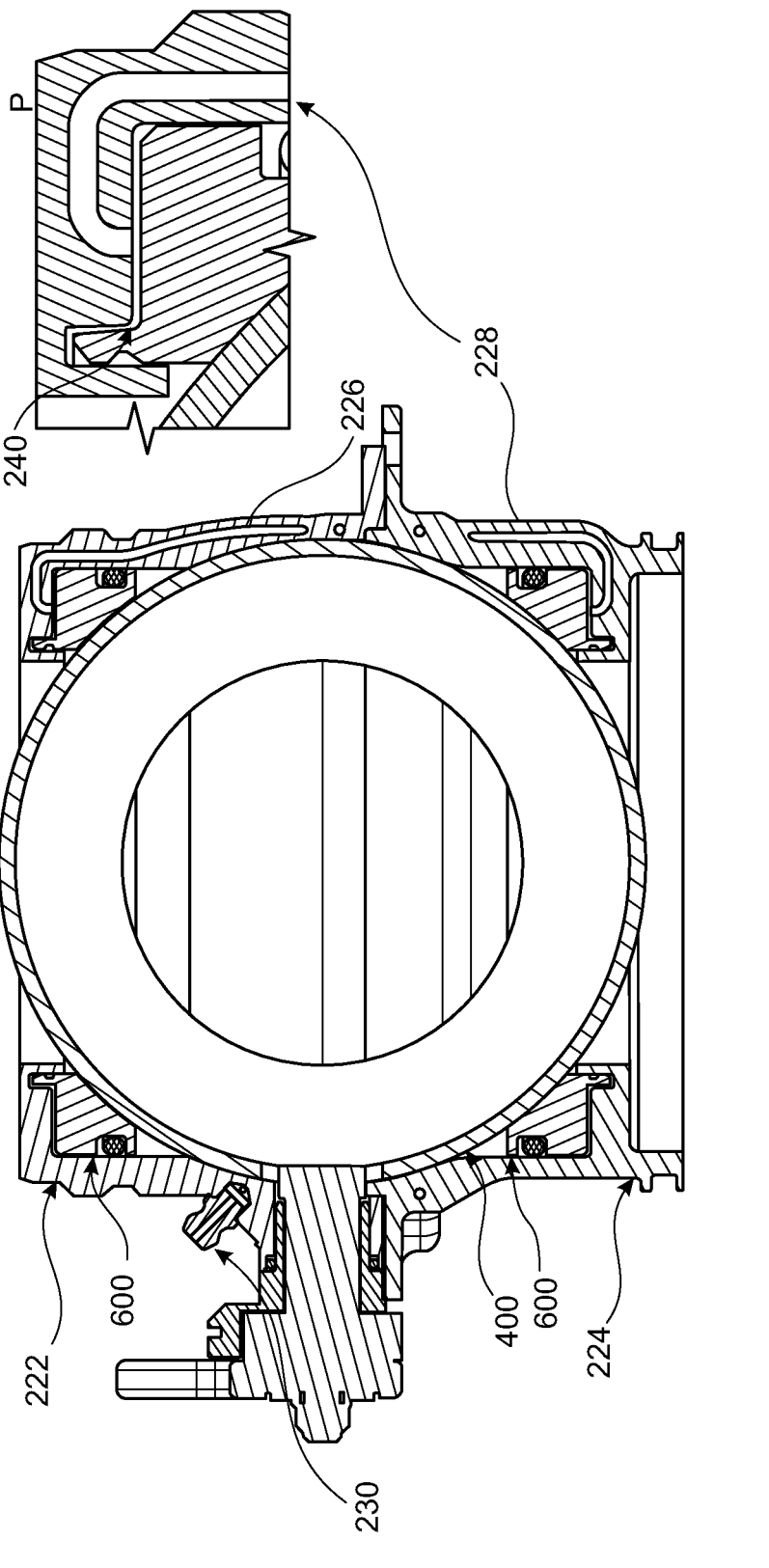
FIG. 4 shows a sectional view, and a detail thereof, of a drain valve such as shown in FIG. 3.
Figure 5:
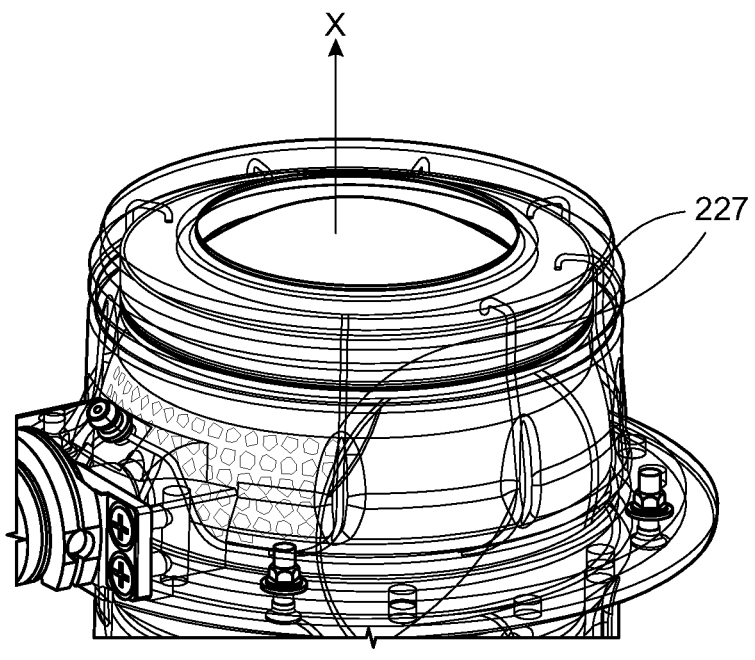
FIG. 5 shows a partial perspective view of a drain valve such as shown in FIG. 3.
Figure 6:
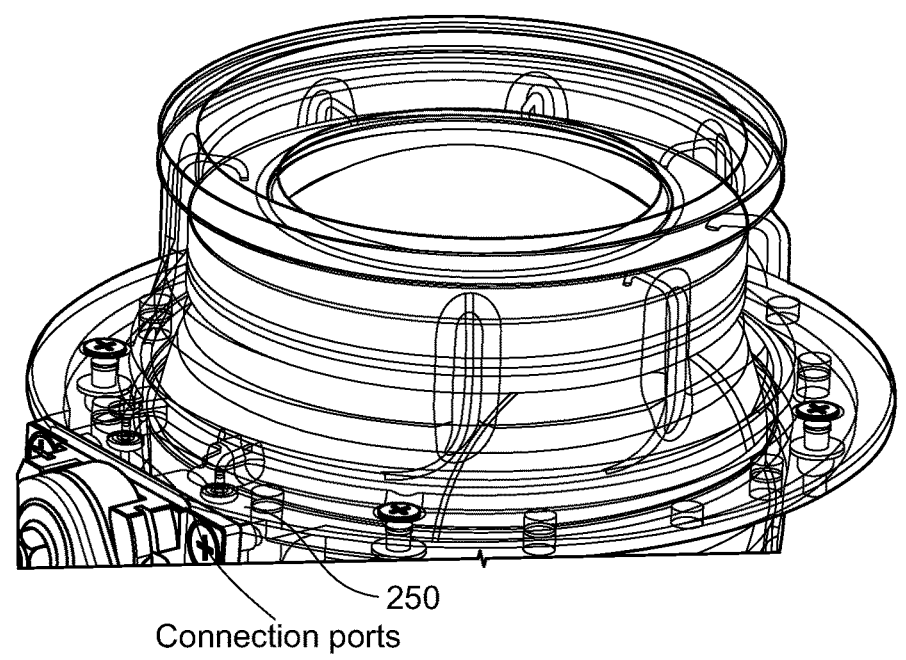
FIG. 6 shows a close up of part of the drain valve shown in FIG. 5.

The provision of the hydraulic fluid to apply pressure to the seals 600 is further described with reference to FIG. 4.

The fluid is provided into the channels 226, 228 inside the housing parts 222, 224 via the fluid nipple 230. The fluid flows along the channel and into a gap 240 between the housing and the seal where it applies pressure to the seal forcing the seal 600 against the ball 400. Here, all channels are fed from a single nipple 230, but in other examples, several nipples may be used.

Referring to an axis X through the ball valve from the top of the housing to the bottom, the hydraulic fluid is provided, from the channels, around the top of a top seal and the bottom of a bottom seal to apply an axial, inward force on the seal, pressing it towards the ball 400.

As mentioned above, while it is possible for different injection ports or nipples to be provided for upper and lower channels 226, 228 for applying pressure to the top and bottom seals, respectively, in an embodiment, it is possible to have just a single injection nipple that supplies fluid to both the top and bottom seals and, therefore, feeds into channels around both the top and the bottom of the housing. This can be facilitated by means of connection ports 250 which connect the upper and lower channels. This connection enables the same sealing pressure to be generated on the top and bottom seals using only a single injection nipple 230.

Figure 7:
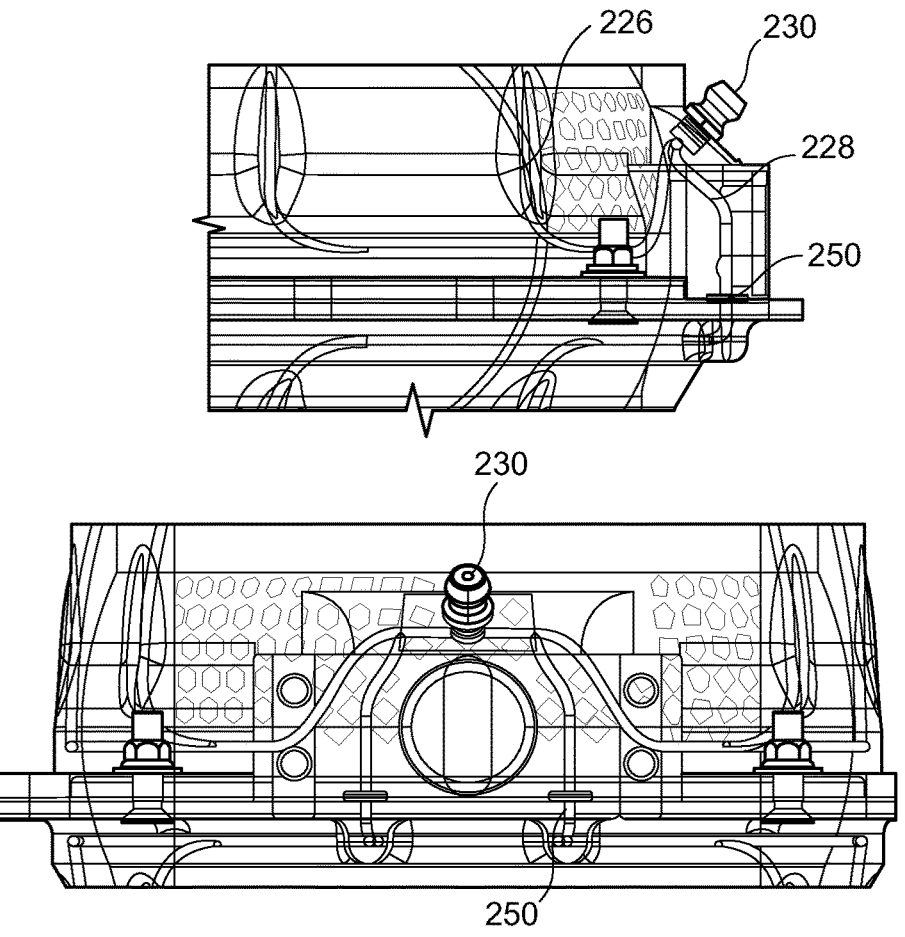
FIG. 7 shows a further close up of a drain valve such as shown in FIGS. 3 to 6.

Two different views of the arrangement are shown in FIG. 7 to show how the design can be adapted to satisfy the required performance criteria. This is facilitated by using additive manufacturing processes to form the sealing arrangement. Channels can, for example, be formed with different diameters and/or cross-sections and with different numbers of sub-branches. There is also some flexibility in how the gap 240 is formed. In the examples described above, the gap extends radially and an axial force is applied, but it is also conceivable that a radial force could be applied to the seal from hydraulic fluid pumped into a side gap (not shown).

The sealing arrangement of this disclosure allows a desired pressure to be applied accurately to seals in a ball valve and for the applied pressure to be accurately adjusted according to design variations and to compensate for geometrical tolerances of the valve assembly.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, the present disclosure is not limited to the particular embodiment disclosed as the best mode contemplated for carrying out this present disclosure, but that the present disclosure will include all embodiments falling within the scope of the claims.

The invention claimed is:

1. A ball valve assembly comprising: a seal, a ball and a valve housing, the ball valve assembly further comprising:
   a hydraulic fluid injection port on the housing configured to receive pressurized fluid from a pressurized fluid source; and
   a plurality of fluid channels formed in the valve housing and connected to the injection port arranged around an interior of the ball valve assembly to direct the pressurized fluid to a gap between the seal and the valve housing of the ball valve assembly to exert a force on the housing and on the seal to force the seal towards the ball of the ball valve assembly.

2. The ball valve of claim 1, wherein the hydraulic fluid injection port is a single injection port and is common to the plurality of fluid channels.

3. The ball valve assembly of claim 1, wherein the plurality of fluid channels include an upper fluid channel and a lower fluid channel.

4. The ball valve assembly of claim 3, wherein the plurality of fluid channels further includes:
   a plurality of upper sub-branches directing the fluid from the upper fluid channel; and
   a plurality of lower sub-branches directing the fluid from the lower fluid channel.

5. The ball valve assembly of claim 3, further comprising:
   connection ports fluidly connecting the upper fluid channel to the lower fluid channel.

6. The ball valve assembly of claim 1, further comprising:
   wherein the valve ball is rotatably mounted in the valve housing; and
   wherein the seal includes a plurality of seals arranged between the valve ball and the valve housing.

7. The ball valve assembly of claim 6, wherein the plurality of seals includes an upper seal and a lower seal and the plurality of channels feed the fluid to a gap above or to the side of each of the upper seal and the lower seal.

8. The ball valve assembly of claim 6, wherein the valve housing comprises:
   an upper housing part; and

6 a lower housing part;
   wherein the upper and lower housing parts joins together to form the valve housing around the ball, the upper housing part having one of the plurality of seals and the lower housing part having one of the plurality of seals, and
   wherein the plurality of channels include channels to the upper housing part and channels to the lower housing part.

9. The ball valve assembly of claim 6, wherein the injection port is a nipple extending through the valve housing and coupled to the plurality of fluid channels within the housing.

10. The ball valve assembly of claim 6, further comprising:
   a handle extending through the valve housing connected to the ball inside the housing, such that rotation of the handle by a user causes rotation of the ball relative to the valve housing.

11. The ball valve assembly of claim 6, wherein the gap is located such that the fluid in the gap applies an axial pressure on the seal, with respect to an axis between a top and bottom of the valve housing.

12. The ball valve assembly of claim 6, wherein the housing is formed by additive manufacturing.

* * * * *